United States Patent
Ludwig et al.

(10) Patent No.: US 7,613,976 B2
(45) Date of Patent: Nov. 3, 2009

(54) METHOD FOR SETTING THE RETRANSMISSION TIMEOUT PERIOD IN A PACKET SWITCHED COMMUNICATION NETWORK

(75) Inventors: Reiner Ludwig, Hürtgenwald (DE); Hannes Ekström, Stockholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 532 days.

(21) Appl. No.: 10/595,018

(22) PCT Filed: Jul. 1, 2003

(86) PCT No.: PCT/EP03/07008

§ 371 (c)(1),
(2), (4) Date: Apr. 27, 2006

(87) PCT Pub. No.: WO2005/006665

PCT Pub. Date: Jan. 20, 2005

(65) Prior Publication Data

US 2006/0234644 A1    Oct. 19, 2006

(51) Int. Cl.
*G08C 25/02* (2006.01)
(52) U.S. Cl. .......... 714/748; 714/746; 714/735
(58) Field of Classification Search .......... 714/748, 714/749, 746, 764, 735; 370/218; 709/235
See application file for complete search history.

(56) References Cited

U.S. PATENT DOCUMENTS

| | | | | |
|---|---|---|---|---|
| 5,774,479 A | * | 6/1998 | Lee et al. | 714/749 |
| 6,112,064 A | * | 8/2000 | Arrowsmith et al. | 455/186.1 |
| 6,333,902 B1 | * | 12/2001 | Shim | 369/47.54 |
| 6,401,127 B1 | * | 6/2002 | Lei et al. | 709/235 |
| 6,608,813 B1 | * | 8/2003 | Chiussi et al. | 370/218 |

FOREIGN PATENT DOCUMENTS

WO    WO 01 13587 A    2/2001
WO    WO 02 058309 A    7/2002

OTHER PUBLICATIONS

Ludwig R et al: "The Eifel retransmission timer" Computer Communication Review, Jul. 2000, ACM, USA, vol. 30, No. 3, pp. 17-27, XP002268525 ISSN: 0146-4833 chapter 4 abstract.
Loguinov D et al: "Retransmission schemes for streaming Internet multimedia: evaluation model and performance analysis" Computer Communication Review, Apr. 2002, ACM, USA vol. 32, No. 2, p. 70-83, XP002268526 ISSN: 0146-4833 chapter 2 abstract.

* cited by examiner

*Primary Examiner*—Scott T Baderman
*Assistant Examiner*—Fritz Alphonse (57) ABSTRACT

A method for updating the value of a time-out period in a data unit sender. The updating includes deriving an intermediate value from the n most recently measured values of a response time, augmenting the intermediate value, reducing the current value of the time-out period, determining the maximum from among the augmented intermediate value and the reduced current value of the time-out period, and setting a new value of the time-out period to set a maximum value.

44 Claims, 4 Drawing Sheets

METHOD FOR SETTING THE RETRANSMISSION TIMEOUT PERIOD IN A PACKET SWITCHED COMMUNICATION NETWORK

FIELD OF THE INVENTION

The present invention relates to a method for updating the value of a time-out period in a data unit sender, and to a data unit sender arranged to perform the method.

BACKGROUND OF THE INVENTION

Generally, in the field of communication one distinguishes between circuit-switched connections and data unit switched communications. In a data unit switched connection, an amount of data to be sent is divided into data units, and these data units are sent in accordance with a protocol governing the communication. It may be noted that the data units receive different names in the context of different protocols, such as packets, frames, segments, etc., In the present application the term "data unit" is used generically to relate to any such subdivision of data.

In order to ensure the reliable transmission of data, many protocols provide the feature of data unit retransmission. More specifically, data unit retransmission means that a data unit receiver implements a feedback mechanism according to which the receiver sends feedback messages to the data unit sender, where each feedback message contains information on the receipt of data units sent by the data unit sender. The type of information in the feedback message can be of various nature, e.g. can acknowledge the correct receipt of a data unit and/or indicate an error in a received data unit. An example for such feedback messages are the acknowledgement messages or ACKs known from TCP and other protocols. The data unit sender reacts to these feedback messages by retransmitting one or more of the sent data units, depending on the information in the feedback messages.

A feature that is typically provided in conjunction with a retransmission mechanism is a so-called retransmission time-out. A time-out feature means that the data unit sender retransmits a given data unit if the data unit sender does not receive within a given time-out period a feedback message indicating the correct receipt of said given data unit. This feature ensures that if a data unit is lost, then the lost data unit will automatically be retransmitted after the above mentioned time-out period.

An example of a protocol that provides a retransmission mechanism accompanied by a time-out feature is the so-called Transmission Control Protocol (TCP), which is a part of the well-known TCP/IP protocol suite.

In the communication between a given sender and a given receiver, it is clear that the time-out period should in some way depend on the response time. The response time is indicative of the time that passes between the sending of a data unit and the receipt of a feedback message relating to that data unit. In TCP and some other protocols, this response is also called the Round Trip Time (RTT).

If the receiver is "distant" (i.e. long response time), then the time-out period should be set longer than for a "close" receiver (i.e. short response time). It is equally understandable, that the time-out period should be set as long as necessary and as short as possible. Namely, if the time-out period is too short, then the data unit sender will not wait long enough for the receipt of a feedback message, and thereby unnecessarily retransmit a given data unit. Such an unnecessary retransmission is also called a spurious retransmission. In other words, a spurious retransmission means that if the sender had waited somewhat longer, it would have received a feedback message and-thereby not retransmitted the data unit. On the other hand, if the time-out period is set too long, then this leads to unnecessary delays in the transmission, as the retransmission of lost data units does not occur soon enough.

Methods for properly calculating a retransmission time-out period on the basis of response time measurements have been in discussion for quite some time, e.g. in RfC 889 dating from 1983. In connection with TCP, the presently used way of updating the retransmission time-out period RTO is defined in RfC 2988. According to this RfC, the updating of RTO on the basis of measured values of the response time or roundtrip time RTT is:

$$\Delta = RTT - SRTT$$

$$SRTT \leftarrow SRTT + \tfrac{1}{8} \cdot \Delta$$

$$RTTVAR \leftarrow RTTVAR + \tfrac{1}{4} \cdot (|\Delta|) - RTTVRR)$$

$$RTO = \max(SRTT + 4 \cdot RTTVAR, 1 \text{ sec}).$$

SRTT represents a smoothed average of the roundtrip time RTT, and RTTVAR represents an indication of the variance of RTT. As a consequence, the concept of RfC 2988 consists in updating or adapting the retransmission time-out period as a weighted sum of a smoothed average of the response time and the variance of the response time, where a minimum value of 1 second is maintained.

The concept defined in RfC 2988 has a number of flaws. It is understandable that the value of the retransmission time-out period should follow the measured values of the response time. In other words, if RTT increases, then RTO should increase, and if RTT decreases, then RTO should decrease. However, this is not always the case with the above-described method of updating RTO. If a sudden drop in RTT occurs, then the fact that the absolute value of $\Delta$ is used in calculating RTTVAR leads to an increase in RTTVAR, which then eventually also leads to a sharp increase in RTO. Therefore, although RTT has decreased, RTO has increased, which leads to unnecessary delay in the sending of data units.

Another problem with the above-described concept of RfC 2988 lies in the so-called "magic numbers" $\tfrac{1}{8}$ and $\tfrac{1}{4}$ used as weighting factors. These factors have been chosen and are optimised to the case when only one measurement RTT is performed per RTT period (i.e. only one RTT is measured at once). However, these factors do not lead to satisfactory results in the updating of RTO when RTT measurements are made for every sent data unit, e.g. by using time stamps, when the number of outstanding data units is large, or if there is no significant variation between consecutive RTT samples. Such a situation may occur when a large queue is maintained in front of a link with limited bandwidth, e.g. a wireless link or a modem link.

It is noted that the term "outstanding data unit" refers to a data unit that was sent, but for which no feedback has yet been received, e.g. no acknowledgment message.

In the above-described situation, the equations proposed by RfC 2988 lead to a situation where SRTT converges to RTT. $\Delta$ converges to zero, such that RTTVAR also converges to zero. As a consequence, the value of RTO converges to RTT. This is undesirable, because RTT can be seen as the absolute minimum value for RTO, as one cannot expect to receive a feedback message in a time shorter than RTT. As a consequence, the above-described phenomenon of RTO "collapsing" into RTT leads to a highly increased probability of spurious retransmissions.

WO 01/13587 A2 proposes methods for an improved updating of RTO. These methods e.g. consist in making the calculation of RTTVAR dependent on a threshold condition for RTT, in making the weighting factors adaptive and in additionally making the updating of RTO dependent on the number of spurious retransmissions.

OBJECT OF THE INVENTION

It is the object of the present invention to provide a new and improved method of updating the value of a time-out period in a data unit sender that comprises a retransmission time-out feature.

SUMMARY OF THE INVENTION

The object is solved by a method described in claim 1 and a data unit sender described in claim 24. Advantageous embodiments are described in the dependent claims.

In accordance with the present invention, the time-out period is updated by a procedure that takes into account the n most recent values of the response time, where n is a positive integer. The updating procedure comprises a procedure for setting a new value of the time-out period that comprises deriving an intermediate value from the n most recent values of the response time in accordance with a predetermined derivation procedure. The intermediate value has the purpose of giving an indication of the present response time. As such, the intermediate value can e.g. be the most recent response time (n=1), the result of a selection operation of the n most recent values of the response time, the result of an averaging operation over the n most recent values of the response time, or the result of any other type of function or selection operation that generates a value that gives an indication of the present response time.

In accordance with the inventive updating procedure, the intermediate value is augmented according to a predetermined augmenting procedure, and the current value of the time-out period is reduced according to a time-out period reducing procedure. Then, the maximum from among at least the augmented intermediate value and the reduced current value of the time-out period is set as a new value of the time-out period.

As one can see, the concept of the present invention is a complete departure from the concept laid out by RfC 2988. It is neither necessary to calculate a smoothed average of the response time (although it is possible when determining the intermediate value), and it especially no longer contemplated to calculate a variance of the response time. On the contrary, the concept of the present invention is a considerable simplification with respect to the concept of RfC 2988. The present invention thereby provides a mechanism for updating the time-out period that shows good performance in experiments, and which is capable of solving the above-discussed problems of the procedure proposed in RfC 2988.

More specifically, due to the procedure for augmenting the intermediate value, where the intermediate value gives an indication of the present response time, it is ensured that the value of the time-out period does not "collapse" into the value of the response time, because the augmenting procedure provides a defined distance between the intermediate value and the value of the time-out period. On the other hand, the reducing procedure for reducing the current value of the time-out period ensures that if the intermediate value decreases (which indicates that the response time is decreasing), then the new value of the time-out period will also decrease. The degree of this decrease or decay is adjusted by the chosen reducing procedure.

BRIEF DESCRIPTION OF FIGURES

The present invention will now be described in more detail with respect to certain third embodiments, which make reference to the enclosed figures, in which.

DETAILED DESCRIPTION

In the following description of examples, reference will be made to terms and expressions known from the Transmission Control Protocol (TCP), such as Retransmission Time-Out period or RTO and Round Trip Time or RTT for the response time indicative of the time that passes between the sending of a data unit and the receiving of a feedback message relating to said data unit. These terms and abbreviations are used for convenience and simplicity, as they are well understood by people skilled in the art, but it is not intended to restrict the application of the concept of the present invention to TCP or any other particular communication protocol. As such, the above-mentioned expressions and abbreviations are used generically. Namely, the concept of the present invention for updating a time-out period can be used in any protocol that provides a retransmission time-out feature, such as e.g. SCTP (Stream Control Transmission Protocol).

Figure 1:
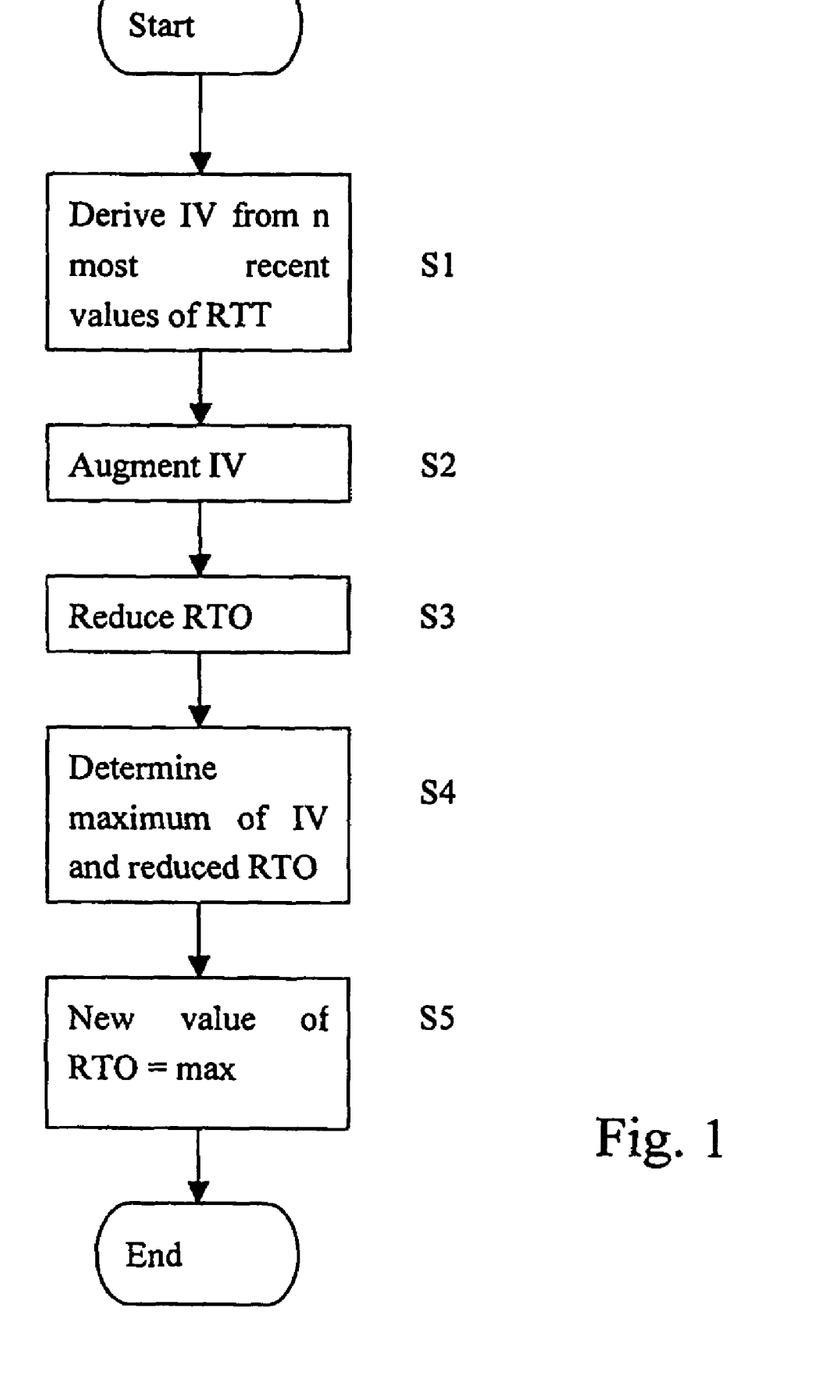
FIG. 1 shows a basic flow chart of an embodiment of the present invention.

FIG. 1 shows a flow chart of a basic embodiment of the present invention. In step Si, an intermediate value IV is derived from the n most recent values of RTT in accordance with a predetermined derivation procedure. In step S2, the intermediate value is augmented in accordance with a predetermined augmenting procedure, and in step S3 the present value of RTO is reduced according to a predetermined RTO reducing procedure. In step S4, the maximum of IV and the reduced RTO is selected, and set as the new value of RTO, RTOnew in step S5.

This can also be expressed in compact form in pseudocode as:

$$RTO = \max(Aug(Der(RTT_i)), Red(RTO)) \quad (1)$$

Red represents the reduction procedure, such as a function or routine for calculating a reduced value of RTO such that Red(RTO)<RTO. Der($RTT_i$) represents the routine for deriving an intermediate value from the n most recent values of RTT, such that IV=Der($RTT_i$), where i=1, . . . n. Aug(IV) represents the augmenting procedure, such as a function or routine for augmenting the value of IV such that Aug(IV)>IV. max represents the operation of selecting the maximum from among the indicated terms.

It may be noted that the overall updating of the time-out period RTO can involve further procedures, and that more than the terms Aug and Red can be involved. Namely, it is conceivable that further control factors be taken into account in the maximum selecting function max, and it is also possible that the final determination of the new value of RTO involves further steps, such as $$RTO = \max(RTO, \max(RTT\_prev, RTT) + 2 \cdot tick) \qquad (2)$$

In equation (2) RTT represents the current value of the response time RTT, RTT_prev represents the immediately previous value of RTT, and tick represents the basic granularity of the underlying timer, i.e. the increments according to which the system timer advances the time count. Equation (2) is performed subsequent to equation (1), i.e. the value RTO indicated on the right-hand side of equation (2) is the value calculated on the left-hand side in equation (1).

Figure 2:
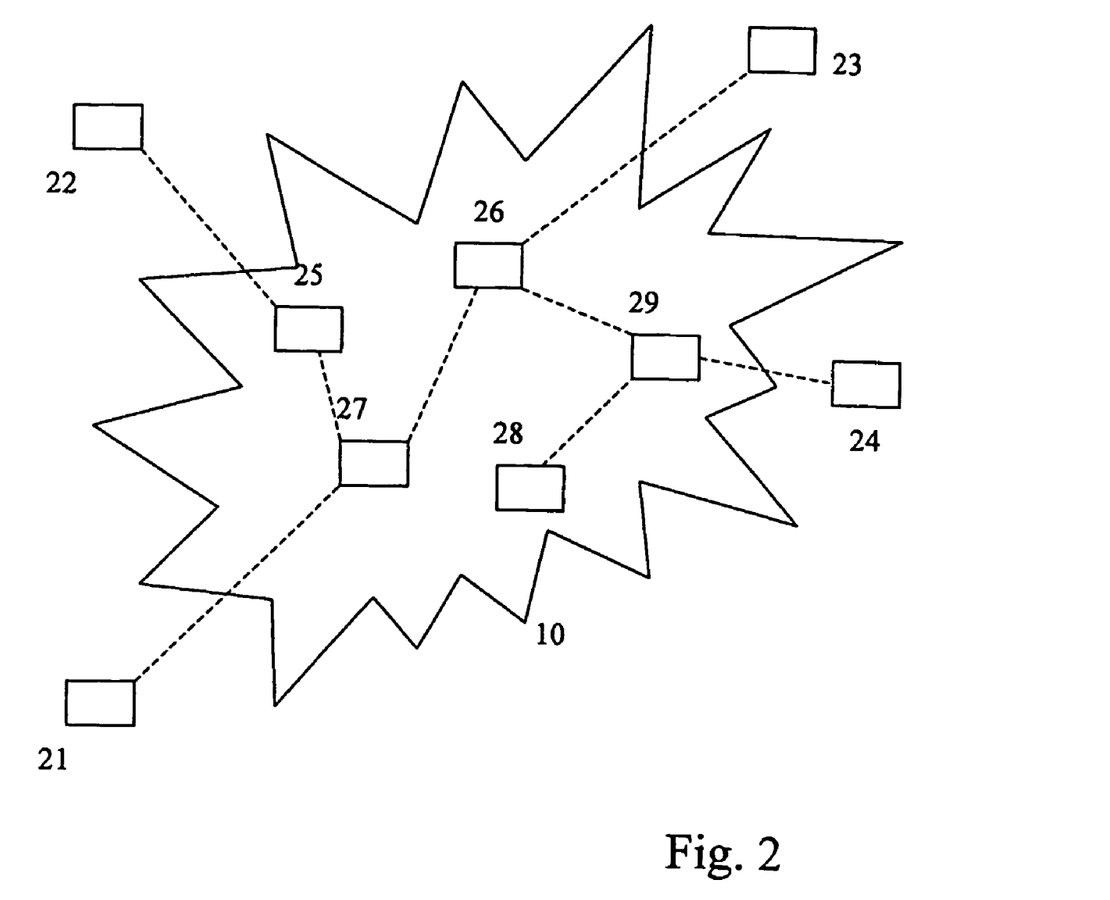
FIG. 2 is a schematic representation of a number of communication devices that communicate over a network and can implement the present invention as data unit senders.

The above-described basic method can be embodied in any device that is capable of acting as a data unit sender and that uses a retransmission time-out feature. FIG. 2 shows a schematic representation of communication devices arranged in a network 10, where devices 21, 22, 23, 24 are represented as terminals, while devices 25, 26, 26, 27, 28, 29 are represented as devices in the network that can act as routers or as other types of servers. Each of these devices 21-29 can act as a data unit sender and thereby implement the concept of the present invention.

Figure 3:
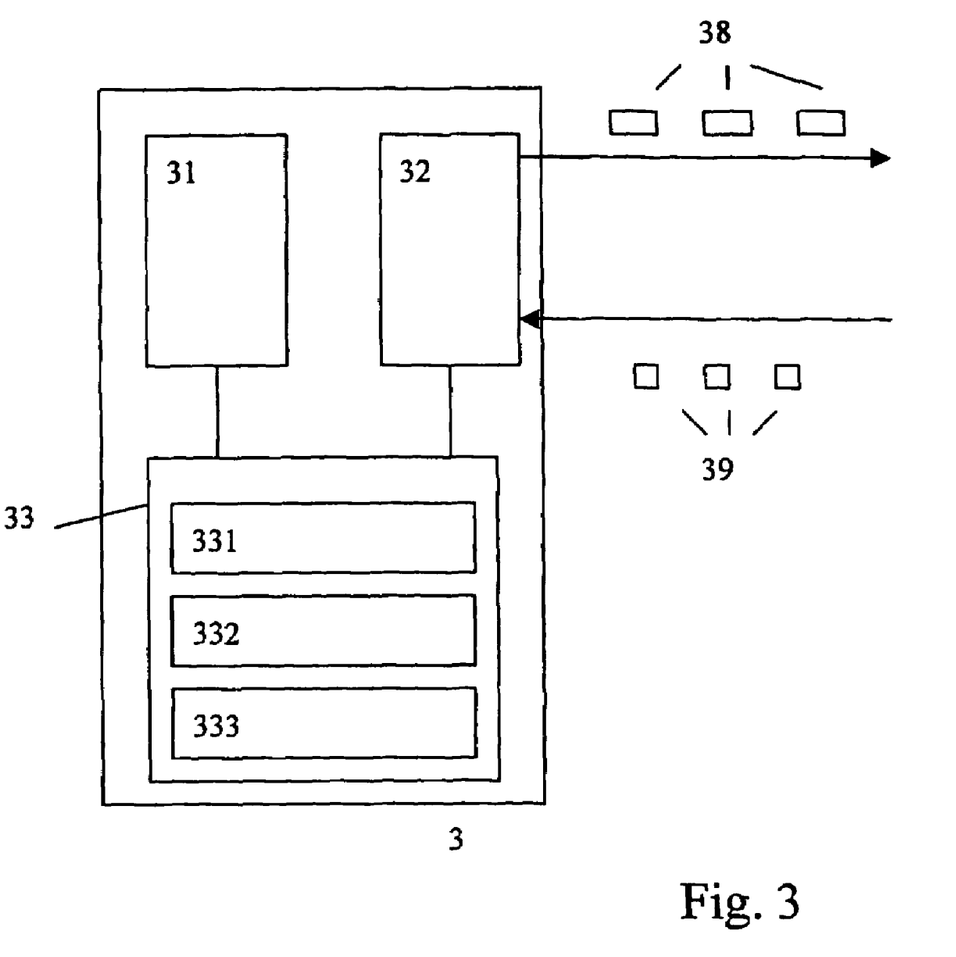
FIG. 3 is a schematic presentation of a data unit sender according to an embodiment of the invention.

FIG. 3 shows a schematic representation of a communication device that can act as a data unit sender and which implements the concept of the present invention. The data unit sender 3 comprises a buffer 31 for holding data, a transmitting/receiving part 32 arranged to send data units and receive data units, e.g. over the network 10 shown in FIG. 2, and a processor 33 that is capable of executing programs for controlling the sending and receiving of data units. 38 represents data units being sent by the sender 3, and 39 represents feedback messages received from the receiver (not shown) of the communication.

The processor 33 is shown as having a retransmission element 331 that implements the retransmission mechanism according to which the data unit sender 3 retransmits data units in dependence on the feedback messages. 332 represents a response time determination element for implementing the response time determining mechanism that repeatedly determines a respond time value. Finally, 333 represents a value setting element that is arranged to conduct the value setting procedure for setting a new value of the time-out period. In the example of FIG. 3, the elements 331-333 are software elements that are executed by processor 33. A software element is a computer program, a part of a computer program or a routine that is capable of executing the corresponding procedure. In this way, the value setting element 333 comprises a sub-element for deriving the intermediate value, a sub-element for conducting the augmenting procedure, a sub-element for conducting the time-out period reducing procedure, a sub-element for selecting the maximum, and a sub-element for setting a new value of the time-out period to the maximum value.

Although it is preferred that the elements for conducting procedures described above and procedures that will be described further on are software elements, it is basically possible to provide these elements in any desired way, i.e. by software, by hardware or by any suitable combination of hardware and software. Due to the possibility of providing the method of the invention in the form of software, the present invention can be embodied in the form of a computer program product comprising a computer program that is capable of performing the method when executed on data unit sender. Such a computer program product can e.g. be a data carrier on which the program is stored.

The purpose of the derivation procedure for obtaining an intermediate value on the basis of the n most recent values of RTT is to provide a value that gives an indication of the present RTT. In the simplest case, this can be the most recent value of RTT, in which case n=1. Alternatively, in order to avoid the influence of singular effects in the RTT measurements, it is also possible to use the two most recent values of the response time, and e.g. set the intermediate value IV to the average of these two, or to choose the maximum of the two most recent RTT measurements.

In general, when considering the n most recent RTT measurements it is possible to average these values in order to generate the intermediate value, or it is possible to perform a selection operation on said n most recent RTT values according to a predetermined selection criterion, and then setting the selected value as the intermediate value. Preferably, the selection criterion is the maximum value, such that the maximum from among the n most recent values of RTT is selected.

In order to retain the simplicity of the inventive solution, it is desirable to not choose n too large. As such, a value of n=2 provides great simplicity, but at the same time already avoids that singular effects in RTT measurements, such as a sudden and transient drop in RTT for one sample, negatively affects the RTO updating procedure.

The reducing procedure Red(RTO) can be arranged in any suitable or desirable way, e.g. by subtracting a constant decrement value from RTO, in order to reduce RTO. Preferably, the reducing procedure Red(RTO) comprises reducing the RTO value to a predetermined decay fraction, said decay fraction lying in the range between 0 and 1. The reducing to a predetermined fraction can e.g. be performed by multiplying by an appropriate factor that has a value in the range between 0 and 1.

Basically, the decay fraction can be chosen in any suitable or desirable way, and can e.g. be a constant. This constant can be adjusted according to the preferences for how aggressive or conservative the value of RTO is to be reduced. Namely, a large value of the fraction means that the reduction is small (conservative), whereas a small value of the fraction means that the reduction is pronounced (aggressive). An example is a value of 0.75.

The constant can also be chosen on the basis of the other control parameters involved in the control of sending data units. For example, the decay fraction can depend on the number of response time measurements made per response time interval in the communication with a given receiver. If the data unit sender is arranged in such a way that only one RTT measurement is conducted at one time, i.e. the data unit sender waits for the completion of a RTT measurement before starting the next RTT measurement, then this number of response time measurements per response time interval is 1. On the other hand, if RTT is measured for each data unit sent, e.g. using the time stamp option, then the number of RTT measurements made per RTT is equal to the number of outstanding data units (sometimes also referred to as the number of data units "in flight"), where outstanding data units are such data units that have been sent but for which no feedback message have yet been received.

The dependency of the decay fraction on the number of RTT measurements per RTT is preferably such that if this number is large, the fraction is closer to 1 than if the number is small. One way of achieving such a dependency is e.g. to calculate the fraction as:

$$FRAC = 1 - \frac{1}{x \cdot SamplesPerRTT} \qquad (3)$$

In equation (3) x is a multiplication factor that may be a constant or an adaptive parameter (as shall be explained in more detail further on) and SamplesPerRTT represents the number of RTT measurements per RTT.

On the basis of equation (3), the reduction procedure Red (RTO) can e.g. be arranged as $$\text{Red}(RTO) = FRAC \cdot RTO \quad (4)$$

As indicated above, the decay fraction may be a constant that in turn may depend on further parameters. However, the decay fraction can also itself be adaptive. In this case, a decay fraction updating procedure is provided, which preferably operates in dependence of the number of spuriously retransmitted data units in the communication with a given data unit receiver. As mentioned previously, a spurious retransmission occurs if e.g. there is excessive delay along the communication between a sender and a receiver, such that the data unit that caused the time-out was not actually lost, and had the RTO been longer, no time-out would have occurred.

The updating procedure is preferably arranged in such a way that it increases the decay fraction (brings it closer to 1) if the number of spurious retransmissions increases, and to reduce the decay fraction (bring it closer to 0) if the number of spurious retransmissions decreases.

More preferably, the updating procedure for the decay fraction comprises monitoring the ratio of the number of spuriously retransmitted data units to the total number of sent data units within a given time span in the communication between sender and receiver. In other words, the updating procedure preferably depends on the relative number of spurious retransmissions. The operation of updating can then comprise providing a first or low threshold and a second or high threshold, said second threshold being higher than said first threshold, and if the measured ratio lies below the low threshold decreasing the decay fraction (i.e. bring it closer to 0 and thereby making the reduction in RTO more aggressive), or if the measured ratio exceeds the high threshold making the decay fraction larger (i.e. bringing it closer to 1, thereby making the reduction in RTO more conservative).

The detection of spurious retransmissions can be done in any suitable or desirable way, e.g. as described in EP-A-1 018 821 or WO 01/13587 A2, which are both herewith incorporated by reference.

Basically, a spurious time-out is identified by determining that after a given data unit was retransmitted due to a time-out, the received feedback message is not in response to the retransmitted data unit, but in response to the data unit that caused the time-out.

One method of determining spurious time-outs can be to have the sender keep a record of the RTT associated with the communication between the sender and receiver (more specifically between the sending peer and the receiving peer), and especially have the sender keep a record of the shortest RTT found during the communication (or session) up to the point of-time under consideration. Then, if a feedback message for a retransmitted data unit is received within a time-out period that is smaller than a predetermined percentage of the shortest RTT, the sender determines that this feedback belongs to the original transmission and not the retransmission. This percentage may be set to a fixed value or may itself be an adaptive parameter. Naturally, it is not necessary that the comparison value multiplied with said percentage is the shortest measured RTT, but rather it is also possible that the sender keeps an average RTT value, such as the SRTT value discussed in the introduction, and that this average value is used as a basis for the determination of spurious retransmissions. In this sense, the comparison value to be multiplied by the percentage is generally a function of one or more RTT values measured in the course of the communication.

Another possibility of determining spurious retransmissions is to have the sender add a mark to data units that it sends, where said mark is defined in such a way that it allows to distinguish between an original transmission and a retransmission. Then, the receiver can accordingly mark feedback messages, such that the sender is capable of identifying if a feedback message refers to the original transmission or the retransmission. This marking of data units can be done in any desired way. For example, it is possible to simply designate a single bit in the sent data units, where one bit value indicates original transmission and the other bit value a retransmission. Another possible mark is a bit stream that may convey more information. A further possibility is to use the so-called time stamp option, which is e.g. well known from TCP. In another words, it is possible to include a time stamp in sent data units, which indicates when the data unit was sent. The receiver can then simply include the same time stamp in the feedback messages, so that the sender has a unique way of identifying the data units to which the feedback message refers.

The above-described updating of the decay fraction can e.g. be achieved by accordingly updating the value of x shown in equation (3). More specifically, based on the above-described ratio of spuriously retransmitted data units to the total number of sent data units and the low threshold and high threshold, x can be increased if the ratio exceeds the high threshold and x can be decreased if the ratio becomes smaller than the low threshold.

The low and high thresholds can be chosen in any suitable or desirable way, where the high threshold could e.g. be 1% and the low threshold 0.5%. Suitable starting values for x can be in the range of 2 to 20. The action of making x larger or smaller can be accomplished by using appropriate predetermined increments or decrements, preferably having the same value.

Similar to the derivation procedure and the time-out period reducing procedure, the augmenting procedure can be chosen in any suitable or desirable way. For example, the augmenting of IV such that Aug (IV)>IV can be done by adding a predetermined increment to IV. Preferably, the augmenting procedure comprises multiplying the intermediate value with a predetermined augmentation factor having a larger value than 1. In other words, the augmentation procedure can be performed as:

$$Aug(IV) = y \cdot IV; \; y > 1 \quad (5)$$

where y may be a constant, or may be an adaptive parameter. y preferably lies in a range between 1 and 2, e.g. y=1.5.

If the augmentation factor y is made adaptable, then an augmentation factor updating procedure is provided, which preferably takes the k most recent values of RTT into account, k being a positive integer. k may have the same value as n, but can also be chosen greater or smaller.

The augmentation factor updating procedure can then comprise: deriving a new value of a variation indication parameter that is indicative of a variation among the k most recent values of RTT, reducing the current value of an augmentation variable according to a predetermined augmentation variable reducing procedure, determining the maximum from among said new value of said variation indication parameter and said reduced augmentation variable, setting a new value of said augmentation variable as said maximum, and setting a new value of said augmentation factor on the basis of said new augmentation variable.

An example of this is given by following equations (6-8):

$$N\_AMP = (RTT - RTTprev)/RTTprev \quad (6)$$

$$Booster = max(N\_AMP, Red^*(Booster)) \quad (7)$$

$$y = f(Booster) \quad (8)$$

N_AMP represents the variation indication parameter, which in the example of equation (6) is the relative difference between the two most recent values of RTT, i.e. the current response time RTT and the immediately preceding response time RTTprev. However, it may be noted that this is only an example, and other definitions of a variation indication parameter are possible.

After determining a new value of N_AMP as indicated in equation (6), the thus calculated value of N_AMP is compared with the reduced current value of the augmentation variable Booster. In equation (7), the maximum of this value is set as the new value of the augmentation variable Booster, and equation (8) represents determining the factor y as a function of the thus determined variable Booster.

The reduction procedure Red* can be chosen in any suitable or desirable way, such that Red*(Booster)<Booster. Preferably, Red* is the same as Red, such that $$Red^*(Booster) = FRAC \cdot Booster \quad (9)$$

When the variation indication parameter is the relative difference between the two most recent values of the response time, y is preferably determined as $$y = 1 + Booster \quad (10)$$

In accordance with the above concept, the augmentation factor updating procedure operates according a similar principle as the updating procedure for RTO. Namely, the variable Booster is either set equal to the momentary change in RTT, or it is set equal to a reduced or decayed version of the previous value of Booster if this reduced version is larger than the momentary change in RTT. Thereby, if RTT suddenly increases, then Booster and consequently y will follow, whereas if the change in RTT becomes small (e.g. a number of RTT measurements produce the same value), Booster and consequently y will decay according to the reduction procedure Red*.

When using the relative difference between the two most recent values of RTT, there arises the question of how to set the initial value of this parameter N_AMP, i.e. when there is only one RTT measurement available, namely the first or initial measurement. The first RTT measurement is sometimes also called SYN RTT, as it is done on the basis of initial synchronisation.

This initial value of the relative difference to be used when the data unit sender starts a new communication with a new receiver may be set to a constant, e.g. such that the initial value of N_AMP is e.g. 1.5 or 2.

Preferably, an initial value adapting procedure is provided for adapting the initial value of the relative difference to be used for a new communication, on the basis of the number of spuriously transmitted initial data units in communications with a plurality of other data unit receivers.

In other words, the data unit sender (e.g. one of the devices 21-29) shown in FIG. 2 monitors the communications with all different data unit receivers it is communicating with. The data unit sender then measures the number of spurious retransmissions that occur on the initial or first data unit sent. Preferably, the data unit sender monitors the ratio of the number of spuriously retransmitted initial data unit on all active communications within a predetermined time period to the number of all active communications within said predetermined time period, i.e. the relative number of spuriously retransmissions on the initial data unit. The initial value adapting procedure can then be conducted by comparing the measured ratio with a low threshold and making the initial value smaller if the ratio lies below the low threshold, and comparing the ratio with a high threshold that is larger than the low threshold, and making the initial value larger if the ratio exceeds that high threshold. The action of making the initial value larger or smaller can be accomplished by using appropriate predetermined increments or decrements, preferably having the same value.

The benefit of such an adaptive procedure for updating the initial value of the relative difference between consecutive RTT measurements is especially pronounced for communications that only have a small number of data units to send. In such cases, a wrongly set initial value of the relative difference will lead to a wrongly set initial value of y, which in turn can not be properly corrected by the procedure for updating y, because there are too few data units that provide updating information or an updating opportunity.

Figure 4:
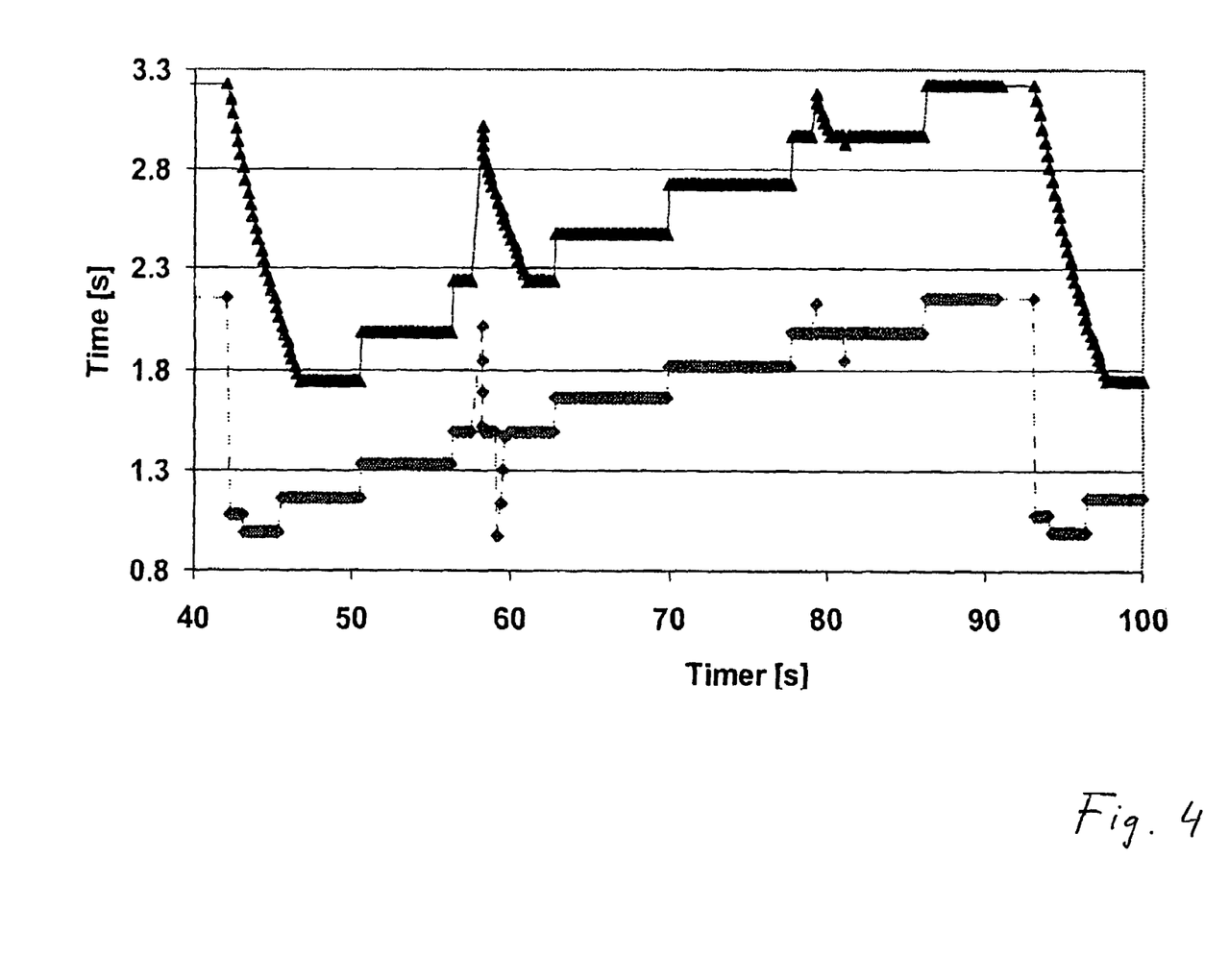
FIG. 4 is a chart showing the behaviour of the response time and the time-out period in an embodiment of the present invention.

FIG. 4 shows a graph of RTO values (triangle symbols) and RTT values (diamond symbols) with respect to values of a system timer, where RTO was updated as:

$$RTO = max(FRAC \cdot RTO, y \cdot RTT) \quad (11)$$

In equation (11) FRAC is determined according to equation (3) with x set to a constant value of 4, and y is set to a constant value of 1.5. One clearly notices that RTO correctly follows the direction of RTT and does not collapse into RTT. The above-described detailed embodiments serve to provide the skilled person with a more thorough understanding of the present invention, but are not intended to be limiting. Much rather, the scope of protection is defined by the appended claims. Reference signs in the claims only serve to make the claims easier to read and are not intended to be limiting.

What is claimed is:

1. A computer implemented method for updating the value of a time-out period (RTO) in a data unit sender that is arranged to send data units to a given data unit receiver, said given data unit receiver implementing a feedback mechanism according to which said given data unit receiver sends feedback messages to said data unit sender, said feedback messages containing information on the receipt of data units sent by said data unit sender, said data unit sender implementing a retransmission mechanism according to which said data unit sender retransmits data units in dependence on said feedback messages, said retransmission mechanism comprising a time-out feature according to which said data unit sender retransmits a given data unit if said data unit sender does not receive within said time-out period a feedback message indicating the correct receipt of said given data unit, and said data unit sender furthermore implementing a response time determining mechanism for repeatedly determining a response time (RTT) indicative of the time that passes between the sending of a data unit to said given data unit receiver and the receiving of a feedback message relating to said data unit from said given data unit receiver, said method comprising:

a value setting procedure for setting a new value of said time-out period, said procedure taking into account the n most recent values of said response time, n being a positive integer, the value setting procedure comprising:
deriving an intermediate value from said n most recent values of said response time in accordance with a predetermined derivation procedure,
augmenting said intermediate value according to a predetermined augmenting procedure, reducing the current value of said time-out period according to predetermined time-out period reducing procedure, determining the maximum from among at least said augmented intermediate value and said reduced current value of said time-out period, and setting a new value of said time-out period to said maximum value.

2. The method according to claim 1, wherein n equals two.

3. The method according to claim 1, wherein said derivation procedure comprises averaging said n most recent values of said response time and setting the averaging result as said intermediate value.

4. The method according to claim 1, wherein said derivation procedure comprises selecting one of said n most recent values of said response time and setting said selected value as said intermediate value.

5. The method according to claim 4, wherein said selecting of one of said n most recent values of said response time comprises selecting the maximum value.

6. The method according to claim 1, wherein said time-out period reducing procedure comprises reducing to a predetermined decay fraction, said decay fraction lying in the range between 0 and 1.

7. The method according to claim 6, wherein said decay fraction depends on the number of response time measurements made per response time interval in the communication with said given data unit receiver.

8. The method according to claim 6, further comprising a decay fraction updating procedure for updating said decay fraction in dependence on the number of spuriously retransmitted data units in the communication with said given data unit receiver.

9. The method according to claim 8, wherein said decay fraction updating procedure comprises monitoring the ratio of the number of spuriously retransmitted data units to the total number of sent data units within a predetermined time span in the communication with said given data unit receiver.

10. The method according to claim 9, wherein said decay fraction updating procedure further comprises:

comparing said ratio with a low threshold and making said decay fraction smaller if said ratio lies below said low threshold, and comparing said ratio with a high threshold that is larger than said low threshold, and making said decay fraction larger if said ratio exceeds said high threshold.

11. The method according to claim 6, wherein said time-out period reducing procedure comprises multiplying by a factor (FRAC) having a value in the range between 0 and 1.

12. The method according to claim 11, wherein said factor (FRAC) is determined as $1 - 1/(x*SpRT)$, where x is an adaptive parameter and SpRT is the number of response time measurements made per response time interval in the communication with said given data unit receiver.

13. The method according claim 1, wherein said augmenting procedure comprises multiplying said intermediate value with a predetermined augmentation factor (y) having a value larger than one.

14. The method according to claim 13, wherein said predetermined augmentation factor (y) is a constant.

15. The method according to claim 13, wherein said predetermined augmentation factor (y) is updated repeatedly in accordance with an augmentation factor updating procedure that takes the k most recent values of said response time into account, k being a positive integer.

16. The method according to claim 15, wherein said augmentation factor updating procedure comprises:

deriving a new value of a variation indication parameter (N_AMP) that is indicative of a variation among said k most recent values of said response time, reducing the current value of an augmentation variable (Booster) according to a predetermined augmentation variable reducing procedure, determining the maximum from among said new value of said variation indication parameter and said reduced augmentation variable (Booster), and setting a new value of said augmentation variable (Booster) as said maximum, setting a new value of said augmentation factor (y) on the basis of said new augmentation variable.

17. The method according to claim 16, wherein said augmentation variable reducing procedure is the same as said time-out period reducing procedure.

18. The method according to claim 16, wherein said variation indication parameter (N_AMP) is the relative difference between the two most recent values of said response time.

19. The method according to claim 18, wherein said new value of said augmentation factor (y) is set as the sum of one and said augmentation variable.

20. The method according to claim 18, wherein said data unit sender is arranged to communicate with a plurality of different data unit receivers, and an initial value adapting procedure is provided for adapting an initial value of said relative difference to be used for a new communication, according to which said data unit sender adapts said initial value on the basis of the number of spuriously retransmitted initial data units in communications with said plurality of data unit receivers.

21. The method according to claim 20, wherein said data unit sender monitors the ratio of the number of spuriously retransmitted initial data units on all active communications within a predetermined time period to the number of all active communications within said predetermined time period.

22. The method according to claim 21, wherein said initial value adapting procedure comprises:

comparing said ratio with a low threshold and making said initial value smaller if said ratio lies below said low threshold, and comparing said ratio with a high threshold that is larger than said low threshold, and making said initial value larger if said ratio exceeds said high threshold.

23. A data unit sender for sending data units to one or more data unit receivers that implement a feedback mechanism according to which said data unit receivers send feedback messages to said data unit sender, said feedback messages containing information on the receipt of data units sent by said data unit sender, said data unit sender comprising:

a retransmission element for implementing a retransmission mechanism according to which said data unit sender retransmits data units in dependence on said feedback messages, said retransmission mechanism comprising a time-out feature according to which said data unit sender retransmits a given data unit if said data unit sender does not receive within said time-out period a feedback message indicating the correct receipt of said given data unit, a response time determination element for implementing a response time determining mechanism for repeatedly determining a response time (RTT) indicative of the time that passes between the sending of a data unit to a given data unit receiver and the receiving of a feedback message relating to said data unit from said given data unit receiver, a value setting element for setting a new value of said time-out period taking into account the n most recent values of said response time, n being a positive integer, the value setting element comprising:

an element for deriving an intermediate value from said n most recent values of said response time, an element for augmenting said intermediate value according to a predetermined augmenting procedure, an element for reducing the current value of said time-out period according to predetermined time-out period reducing procedure, an element for determining the maximum from among at least said augmented intermediate value and said reduced current value of said time-out period, and an element for setting a new value of said time-out period to said maximum value.

24. The data unit sender according to claim 23, wherein n equals two.

25. The data unit sender according to claim 23, wherein said element for deriving an intermediate value comprises an element for averaging said n most recent values of said response time and setting the averaging result as said intermediate value.

26. The data unit sender according to claim 23, wherein said element for deriving an intermediate value comprises an element for selecting one of said n most recent values of said response time and setting said selected value as said intermediate value.

27. The data unit sender according to claim 26, wherein said element for selecting one of said n most recent values of said response time is arranged to select the largest value.

28. The data unit sender according to claim 23, wherein said element for conducting said time-out period reducing procedure comprises an element for reducing to a predetermined decay fraction, said decay fraction lying in the range between 0 and 1.

29. The data unit sender according to claim 28, wherein said element for conducting said time-out period reducing procedure is arranged to make said decay fraction dependent on the number of response time measurements made per response time interval in the communication with said given data unit receiver.

30. The data unit sender according to claim 28, further comprising an element for conducting a decay fraction updating procedure for updating said decay fraction in dependence on the number of spuriously retransmitted data units in the communication with said given data unit receiver.

31. The data unit sender according to claim 30, wherein said element for conducting said decay fraction updating procedure comprises a monitor for monitoring the ratio of the number of spuriously retransmitted data units to the total number of sent data units within a predetermined time span in the communication with said given data unit receiver.

32. The data unit sender according to claim 31, wherein said element for conducting decay fraction updating procedure further comprises an element for comparing said ratio with a low threshold and making said decay fraction smaller if said ratio lies below said low threshold, and an element for comparing said ratio with a high threshold that is larger than said low threshold, and making said decay fraction larger if said ratio exceeds said high threshold.

33. The data unit sender according to claim 28, wherein said element for conducting said time-out period reducing procedure further comprises an element for multiplying by a factor having a value in the range between 0 and 1.

34. The data unit sender according to claim 33, comprising an element for determining said factor is as $1 - 1/(x*SpRT)$, where x is an adaptive parameter and SpRT is the number of response time measurements made per response time interval in the communication with said given data unit receiver.

35. The data unit sender according to claim 23, wherein said element for conducting said augmenting procedure comprises an element for multiplying said intermediate value with a predetermined augmentation factor having a value larger than one.

36. The data unit sender according to claim 35, wherein said predetermined augmentation factor is a constant.

37. The data unit sender according to claim 35, comprising an element for updating said predetermined augmentation factor in accordance with an augmentation factor updating procedure that takes the k most recent values of said response time into account, k being a positive integer.

38. The data unit sender according to claim 37, wherein said element for conducting said augmentation factor updating procedure comprises:

an element for deriving a new value of a variation indication parameter that is indicative of a variation among said k most recent values of said response time, an element for reducing the current value of an augmentation variable (Booster) according to a predetermined augmentation variable reducing procedure, an element for determining the maximum from among said new value of said variation indication parameter and said reduced augmentation variable (Booster), and an element for setting a new value of said augmentation variable (Booster) as said maximum, and an element for setting a new value of said augmentation factor (y) on the basis of said new augmentation variable.

39. The data unit sender according to claim 38, wherein said element for conducting said augmentation variable reducing procedure is arranged to perform said augmentation variable reducing procedure in the same way as said element for conducting said time-out period reducing procedure is arranged to conduct said time-out period reducing procedure.

40. The data unit sender according to claim 38, wherein said variation indication parameter is the relative difference between the two most recent values of said response time.

41. The data unit sender according to claim 40, comprising an element for setting said new value of said augmentation factor as the sum of one and said augmentation variable.

42. The data unit sender according to claim 40, arranged to communicate with a plurality of different data unit receivers, and comprising an element for conducting an initial value adapting procedure for adapting an initial value of said relative difference to be used for a new communication, according to which said data unit sender adapts said initial value on the basis of the number of spuriously retransmitted initial data units in communications with said plurality of data unit receivers.

43. The data unit sender according to claim 42, comprising a monitor for monitoring the ratio of the number of spuriously retransmitted initial data units on all active communications within a predetermined time period to the number of all active communications within said predetermined time period.

44. The data unit sender according to claim 43, wherein said element for conducting said initial value adapting procedure comprises:

an element for comparing said ratio with a low threshold and making said initial value smaller if said ratio lies below said low threshold, and an element for comparing said ratio with a high threshold that is larger than said low threshold, and making said initial value larger if said ratio exceeds said high threshold.

* * * * *

UNITED STATES PATENT AND TRADEMARK OFFICE
CERTIFICATE OF CORRECTION

| | | |
|---|---|---|
| PATENT NO. | : 7,613,976 B2 | Page 1 of 1 |
| APPLICATION NO. | : 10/595018 | |
| DATED | : November 3, 2009 | |
| INVENTOR(S) | : Ludwig et al. | |

It is certified that error appears in the above-identified patent and that said Letters Patent is hereby corrected as shown below:

In Column 1, Line 21, delete "etc.," and insert -- etc. --, therefor.

In Column 2, Line 3, delete "and-thereby" and insert -- and thereby --, therefor.

In Column 2, Line 20, delete "RTTVRR)" and insert -- RTTVRR --, therefor.

Signed and Sealed this

Eighteenth Day of May, 2010

David J. Kappos
*Director of the United States Patent and Trademark Office*